J. S. Patric, Air-Compressor.
4337
REISSUED APR 11 1871
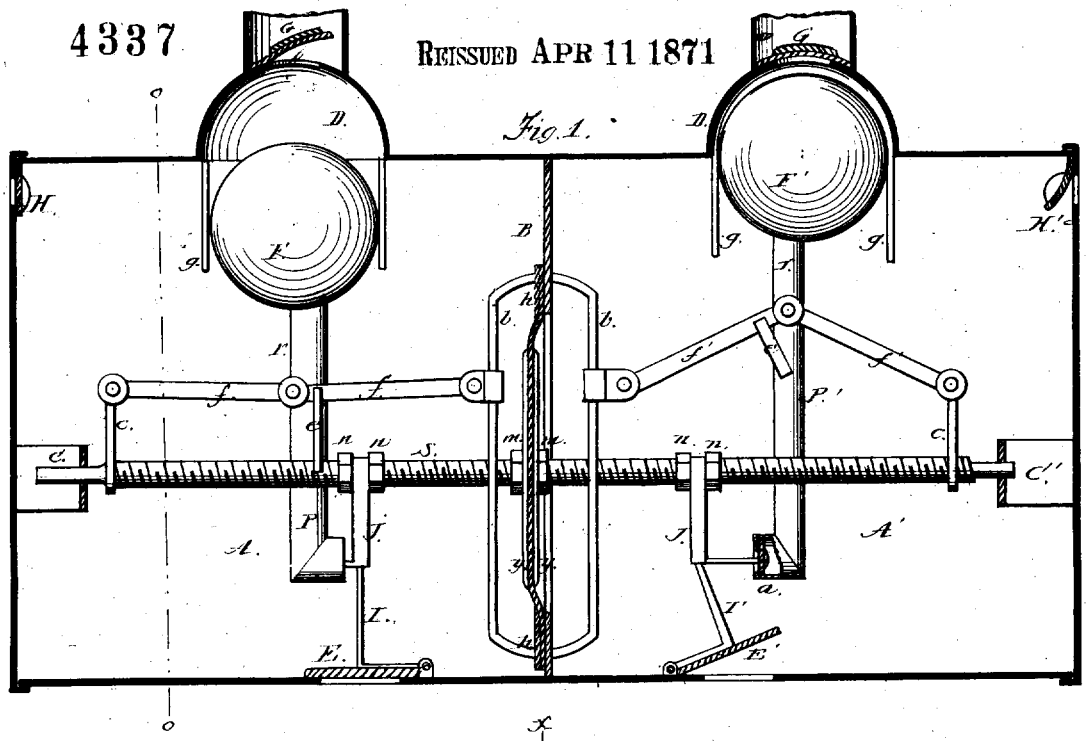
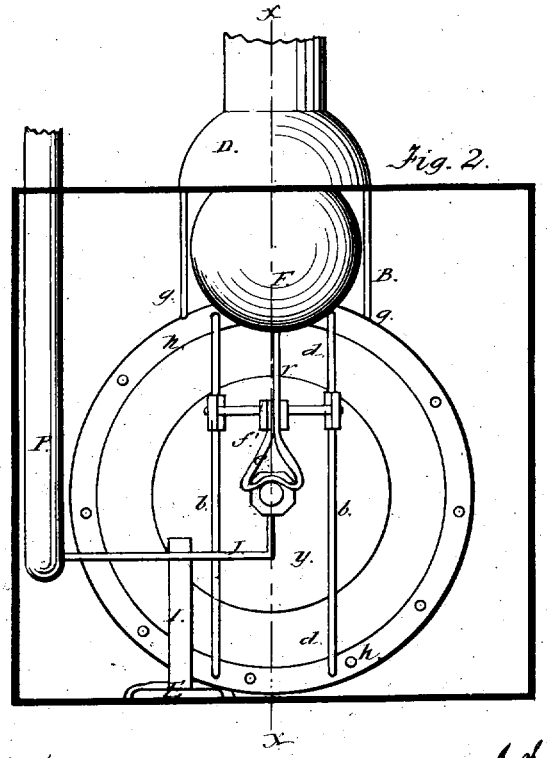
Edw. W. Donn
Thomas H. Crowler
J. S. Patric
By Jno. Houghborough & Co
Attys

UNITED STATES PATENT OFFICE.

JOHN S. PATRIC, OF ROCHESTER, NEW YORK

IMPROVEMENT IN AIR-COMPRESSING APPARATUS.

Specification forming part of Letters Patent No. 47,328, dated April 18, 1865; reissue No. 4,337, dated April 11, 1871.

*To all whom it may concern:*

Be it known that I, JOHN S. PATRIC, of Rochester, in the county of Monroe and State of New York, (formerly of Victor, in the county of Ontario,) have invented a certain Improved Apparatus for Compressing Atmospheric Air, of which the following is a specification:

The object of my invention is to compress air by means of a column of water, which air may be readily conveyed in pipes to convenient places to supply atmospheric-engines for driving machinery and for other purposes; and its mechanical detail consists mainly in the employment for that purpose of a reservoir or chamber composed of two compartments, which are separated by a flexible diaphragm connected to an adjusting-bar that operates the inlet and outlet water-valves of each chamber.

In the drawing, Figure 1 is a vertical longitudinal section of my invention taken at the red line *x*, Fig. 2, and representing the extremity of an inlet-pipe, P′, broken away. Fig. 2 is a transverse section in the plane of the red line *o*, Fig. 1.

A and A′ in the drawing represent the two compartments in which the air is compressed by the pressure of the water forced through the pipes P P′ under a head. B is the web or partition to which the flexible diaphragm *d* is attached by means of the metallic ring *h*, which is riveted or otherwise secured to the partition. C and C′ are guides or supports for the ends of the adjusting-bar or screw S; D D, domes, into which the floats F and F′ rise alternately; E and E, the outlet water-valves; G and G, the valves through which the compressed air escapes from the compressing-chamber; H and H′, the inlet air-valves. The reversing-bar S is attached to the diaphragm *d* by clamping the disks *y* between the nuts *m m*, screwed upon the bar. The stems of the inlet water-valves *a* are connected to the bar S by set-nuts *n n*, and the upper ends of the arms I I′ of the outlet-valves E E′ are attached loosely to the arms J of said stems. The extremities of the bar S are allowed to slide freely in the guides C C′. Each pair of knee-levers *f f′* is hinged at one end to ears projecting from the bent rods or bridge-trees *b*, which are rigidly fixed to the web B, and their opposite ends are jointed to the studs *c c′*, which may be screwed upon the bar S, as shown, or fitted loosely thereon, and clamped between jam-nuts similarly to the arms J, the latter construction being preferable for varying the longitudinal throw of the screw S. The float-rods *r* are pivoted to the center joint of these knee-levers, and a stop, *e*, is secured to one lever in each compartment, which comes in contact with the bar S as the water is discharged, whereby the descent of the float is limited and the lever centers made to occupy a position nearly or quite in a straight line. Thus the bar S and diaphragm *d* are effectually locked at either extremity of their movement until the next influx of water which lifts the float, and by its pressure forces the flexible diaphragm and bar to their opposite position; and one of the studs, as *c′*, being also moved back, allows the knee-levers *f′* and float F′ to drop to the position determined by the stop *e*. The apparatus is placed at the foot of the fall or column of water, which is supplied to the compartments A A′ alternately through pipes P P′. The relative position of the parts in the two chambers is shown in Fig. 1 as just previous to a change, which will empty A and fill A′. When the water in A rises a little above the height indicated by the red dotted line in Fig. 1 the float F and knee-levers *f* are raised, and the bar S being thereby released, the pressure against the diaphragm forces it to its opposite position, as before stated, thus opening the discharge water-valve E and inlet-valve *a*, and closing E′ and the valve in P, all of which are locked in that position by the fall of the float F′ and knee-lever *f′* in chamber A′, the consequent reaction of water and air closing G and H′ and opening H and G′ simultaneously. The air is supplied to the compressor through the valves H H′, and discharged for use through G and G′, which latter may communicate with one common reservoir.

In the practical operation of my apparatus I find that several valuable results are obtained which tend to increase its efficiency and economy. It is well known that when air is compressed it is heated to a temperature proportionate to the degree of condensation, such thermal change increasing the pressure during the act of mechanical compression. The consequence is that, as the air circulates through the distributing-pipes or reservoirs and becomes cooled, the pressure is reduced, and thus a portion of the force of the water-head, which might otherwise be utilized in the compressor, is lost in the pipes.

This, in many cases, is a serious though often overlooked source of loss in air-compressing contrivances. Since, however, in my device the water is introduced at a high pressure into a chamber of considerably larger area than that of the inlet-pipes, when the valves in said pipes are opened it rushes in, boiling and foaming and mixing itself with the air, and thus preventing the increase of temperature above mentioned. During the operation of filling a chamber, however, the water, by the resistance of the air, soon becomes calm, allowing the bubbles of air to rise from the surface and be forced upward, with that which remains in the chamber, through the outlets G G′. By the action of the water, also, in filling an enlarged chamber at the base of the pipe, a partial vacuum is formed at the upper parts of said pipe, by which the air is drawn in and carried down to compressor, thus adding to the volume of air compressed beyond that contained in the chamber, a result not possible were the supply-pipe and compressing-chamber of equal or nearly equal area. Besides these advantage it is obvious that the apparatus herein described is automatic and self-governing. The chambers are automatically filled and emptied by means of the floats, knee-levers, diaphragm, and valves, all the parts being operated by the action and reaction of the air and water without any extraneous aid whatever. It is self-governing, since as soon as the air-pressure in the distributing-pipes or reservoir equals the water-pressure due to the fall the action of the compressor ceases, owing to the equilibrium, until a reduction of the air-pressure takes place, when the parts begin to operate as before described; and any variation in the air-pressure causes a corresponding variation in the movements of the compressor, the supply of air being thus kept constant. The valves H and H′ may be attached to the top instead of the sides of the chamber by applying a light spring to keep them closed when necessary. The floats F F′ may be flattened, if desired, to make them more sensitive upon the water. Pendants *g* guide the floats F F′ into the domes, there being three or more to each float. A single compressing-chamber may be used by attaching the two water-valves to a weighted lever hinged at the bottom, and the upper end being thrown each way past the center by the alternate rising and falling of the float. This would be less desirable, perhaps, than the double chambers, because the action would be intermittent.

What I claim as my invention is—

1. An air-compressing chamber, A′, provided with inlet and outlet-valves H′ G′, outlet water-valves E′, and inlet-pipe P′ and valve *a*, the area of which pipe is less than the area of a cross-section of the chamber in any direction, the parts being arranged to operate substantially as set forth, whereby the water is agitated upon its entrance into said chamber, for the purpose of preventing a rise of temperature of the air during the process of compression.

2. In combination with an air-compressing chamber, A′, the water outlet and inlet-valves *a* E′ and air-inlet and discharge-valves H′ G′, constructed and arranged to be automatically operated by the action or reaction of the air and water, substantially as set forth.

3. The combination of the floats F F′ and the diaphragm *d* with the inlet and outlet water-valves *a* and E E′, the parts being arranged to operate substantially in the manner set forth.

4. The combination of the water-valves *a* and E, bar S, and diaphragm *d*, operating substantially as described.

5. The combination of the floats F and F′ with the jointed levers *f f′*, arranged and operating substantially in the manner and for the purposes set forth.

Witnesses: J. S. PATRIC.

F. H. CLEMENT,

WM. S. LOUGHBOROUGH.